United States Patent
Libertini

(10) Patent No.: US 9,976,624 B2
(45) Date of Patent: May 22, 2018

(54) DAMPER AND PRE-DAMPER ASSEMBLY

(71) Applicant: Eaton Corporation, Cleveland, OH (US)

(72) Inventor: Fabio A. Libertini, Campinas (BR)

(73) Assignee: Eaton Intelligent Power Limited, Dublin (IE)

( * ) Notice: Subject to any disclaimer, the term of this patent is extended or adjusted under 35 U.S.C. 154(b) by 0 days. days.

(21) Appl. No.: 14/891,749

(22) PCT Filed: May 16, 2014

(86) PCT No.: PCT/US2014/038311
§ 371 (c)(1),
(2) Date: Nov. 17, 2015

(87) PCT Pub. No.: WO2014/186650
PCT Pub. Date: Nov. 20, 2014

(65) Prior Publication Data
US 2016/0116019 A1  Apr. 28, 2016

Related U.S. Application Data

(60) Provisional application No. 61/824,519, filed on May 17, 2013.

(51) Int. Cl.
| | | |
|---|---|---|
| F16F 15/123 | (2006.01) | |
| F16F 15/12 | (2006.01) | |
| F16D 13/68 | (2006.01) | |

(52) U.S. Cl.
CPC ........ *F16F 15/1238* (2013.01); *F16F 15/123* (2013.01); *F16F 15/1203* (2013.01); *F16F 15/12386* (2013.01)

(58) Field of Classification Search
CPC .. F16F 15/1203; F16F 15/123; F16F 15/1238; F16F 15/12386; F16F 13/68; F16F 13/70
See application file for complete search history.

(56) References Cited

U.S. PATENT DOCUMENTS

| | | |
|---|---|---|
| 4,606,451 A | 8/1986 | Martinez-Corral |
| 4,637,500 A | 1/1987 | Gobel et al. |

(Continued)

FOREIGN PATENT DOCUMENTS

| | | |
|---|---|---|
| CN | 1580597 A | 2/2005 |
| CN | 101298878 A | 11/2008 |
| DE | 1680049 | 4/1972 |

OTHER PUBLICATIONS

Extended European Search Report for Application No. 14798041.1, dated Dec. 20, 2016, pp. 1-7.

*Primary Examiner* — Jacob S. Scott
*Assistant Examiner* — Tinh Dang
(74) *Attorney, Agent, or Firm* — Mei & Mark, LLP

(57) ABSTRACT

A clutch assembly is disclosed that includes a hub, a damper and a pre-damper. A first pre-damper side plate is adjacent the damper and a second pre-damper side plate has a lug that extends radially outwardly and axially across the intermediate plate and the first pre-damper plate toward a first side plate of the damper that is adjacent the pre-damper. The lug is received in a notch defined by the first side plate of the damper to prevent relative rotation between the first side plate of the damper and the pre-damper. A method is disclosed for assembling the pre-damper and the damper on a hub. The pre-damper includes a radially and axially extending lug that is assembled to the notch in the damper to prevent relative rotation between the damper and the pre-damper.

20 Claims, 2 Drawing Sheets

(56) References Cited

U.S. PATENT DOCUMENTS

| | | | |
|---|---|---|---|
| 4,669,593 A * | 6/1987 | Raab | F16F 15/1238 |
| | | | 192/213.1 |
| 4,998,608 A * | 3/1991 | Raab | F16F 15/1238 |
| | | | 192/213.12 |
| 5,000,304 A | 3/1991 | Kock et al. | |
| 5,257,687 A | 11/1993 | Cooke | |
| 5,582,280 A * | 12/1996 | Schneider | F16F 15/1238 |
| | | | 192/107 R |
| 5,687,828 A | 11/1997 | Ament et al. | |
| 6,283,865 B1 * | 9/2001 | Hashimoto | F16F 15/1238 |
| | | | 192/213.22 |
| 6,923,305 B2 | 8/2005 | Dulancy et al. | |

\* cited by examiner

DAMPER AND PRE-DAMPER ASSEMBLY

CROSS-REFERENCE TO RELATED APPLICATIONS

This is a §371 National Stage entry of Application No. PCT/US2014/038311, filed May 16, 2014, which claims the benefit of U.S. provisional application No. 61/824,519, filed May 17, 2013, which are incorporated herein by reference.

TECHNICAL FIELD

This disclosure relates to a clutch damper that is provided with a pre-damper for damping vibrations while idling and is assembled to the main damper to prevent relative rotation.

BACKGROUND

Clutches for vehicle transmissions include dampers for damping vibrations caused by clutch engagement and release. Pre-dampers are coupled to main dampers for damping vibrations during idling and to improve the damping function of the main damper.

One problem with manufacturing dampers with pre-dampers is the staking operation used to attach the pre-damper to the hub can result in misalignment. The hub is tightly engaged by the pre-damper and no way to compensate for misalignment. In addition, the dampers and pre-dampers are assembled to the hub in the same manufacturing operation. This results in added complexity on the assembly line.

Prior damper and pre-damper designs include a hub that is enclosed in the main damper. The pre-damper includes a cover that is staked to the hub to assemble the pre-damper to the main damper. The rigid connection between the main damper and the hub precludes angular movement. Perpendicular deviation from the hub spline to the facing surfaces of the clutch plates translates into additional gap needed to allow the damper assembly to spin freely.

The above problems and other problems are addressed by this disclosure as summarized below.

SUMMARY

According to one aspect of this disclosure, a clutch assembly is disclosed that includes a hub, a damper and a pre-damper. The damper is attached to the hub and includes first and second side plates disposed on opposite axial sides of a pair of friction plates having friction linings. The side plates and the friction plates are operatively connected by a plurality of damper springs for damping between the side plates and the friction plates. The pre-damper is attached to the hub adjacent the damper and is attached to the hub. The pre-damper has an intermediate plate and first and second pre-damper side plates disposed on opposite axial sides of the intermediate plate that are operatively connected by a plurality of pre-damper springs. The first pre-damper side plate is adjacent the damper and the second pre-damper side plate has a lug that extends radially outwardly and axially across the intermediate plate and the first pre-damper plate toward the first side plate. The lug is received in a notch defined by the first side plate of the damper to prevent relative rotation between the first side plate of the damper and the pre-damper.

According to other aspects of this disclosure as it relates to the clutch assembly, the lug may include first and second radially extending sides that engage first and second radially extending edges of the notch. The lug may include an outer axial side and an inner axial side. The notch may include a surface extending circumferentially between the first and second radial edges of the notch. The inner axial side of the lug may be spaced from the circumferentially extending surface of the notch to allow a limited degree of axial and radial movement between the lug and the notch. The damper may define a plurality of spring pockets that are each adapted to receive one of the damper springs. Each of the spring pockets may define one of the notches that may be circumferentially centered relative to the spring pockets.

According to another aspect of this disclosure, a method is disclosed for assembling a pre-damper and a damper to a hub. The method begins with the step of providing a hub and assembling a damper that includes a damper cover that defines a notch to the hub. The pre-damper is then assembled to the hub. The pre-damper includes a side plate that has a radially and axially extending lug that is assembled to the hub after the damper is assembled to the hub. The lug is secured into the notch to prevent relative rotation between the damper and the pre-damper.

According to other aspects of the method, the step of assembling the damper may further comprise selecting a first side plate that defines a plurality of spring pocket openings and notching each of the spring pocket openings in the first side plate. The first side plate and a second side plate are assembled on opposite axial sides of a plurality of friction plates. One of a plurality of damper springs is assembled into each of a plurality of spring pocket openings.

The step of assembling the pre-damper may further comprise selecting a first pre-damper side plate and a second pre-damper side plate that has a lug that extends radially outwardly and in an axial direction. The first and second pre-damper side plates are assembled on opposite axial sides of an intermediate plate and operatively connect the side plates to the intermediate plate with a plurality of pre-damper springs. The step of securing the lug into the notch may include aligning the lug with the notch when the pre-damper is assembled to the hub.

The step of assembling the damper may be performed in a first assembly operation and the step of assembling the pre-damper is performed in a second assembly operation. The steps of assembling the damper to the hub, assembling the pre-damper to the hub, and securing the lug into the notch may be performed in a subsequent series of assembly operations after the first and second assembly operations.

The above aspects of this disclosure and other aspects will be described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
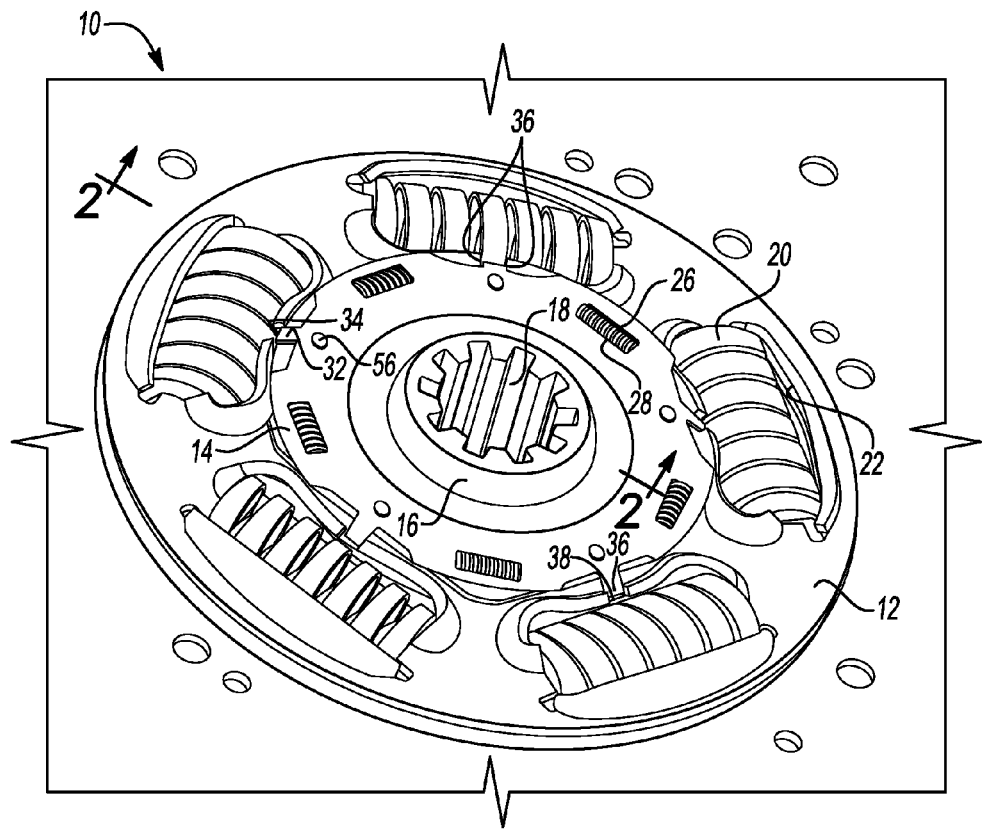
FIG. 1 is a perspective view of a damper and pre-damper assembly made according to one aspect of this disclosure.

Referring to FIG. 1, a damper assembly 10 is illustrated that includes a main damper 12 of a pre-damper 14. The main damper 12 and pre-damper 14 are attached to a hub 16 as is well known in the art. Hub 16 includes a plurality of splines 18 on its inner diameter. The splines are used to connect hub 16 to a main shaft of a transmission (not shown).

A plurality of damper springs 20 are received in a plurality of damper spring pockets 22 that are provided on the main damper 12. A plurality of pre-damper springs 26 are received in a plurality of pre-damper spring pockets 28 that are provided on the pre-damper 14.

A lug 32 is formed on the pre-damper 14. The lug 32 is received in a notch 34 defined by the main damper 12. The notch 34 includes first and second radially extending sides 36 and a circumferentially extending surface 38. The lug 32 is received in the notch 34 so that it engages both of the radially extending sides 36 of the notch 34.

Figure 2:
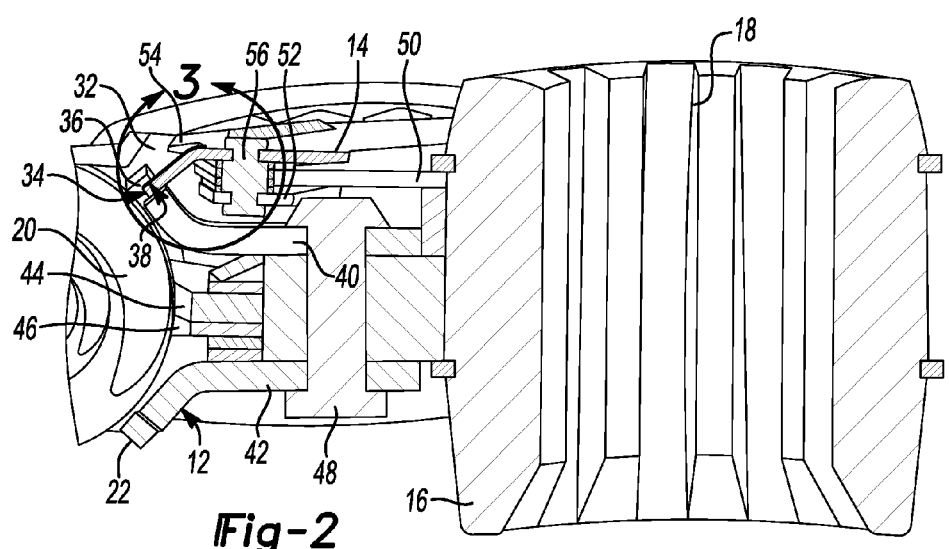
FIG. 2 is a fragmentary cross-sectional view taken along the line 2-2 in FIG. 1.

Referring to FIG. 2, portions of the main damper 12 and pre-damper 14 are shown in cross-section through the lug 32 and notch 34. The cross-section is taken from the hub 16 to show the splines 18 and part of the damper spring 20. Damper spring 20 is disposed in the spring pocket 22. The main damper 12 includes a first side plate 40 and a second side plate 42 that are assembled on opposite sides of a first friction plate 44 and a second friction plate 46. The friction plates 44 and 46 are provided with friction linings (not shown) that are radially outboard of the damper springs 20, as is well known in the art. The side plates 40, 42 and friction plates 44, 46 are secured together by a guide pin 48 that functions to guide the friction plates 44 and 46 as they are engaged and disengaged.

Figure 3:
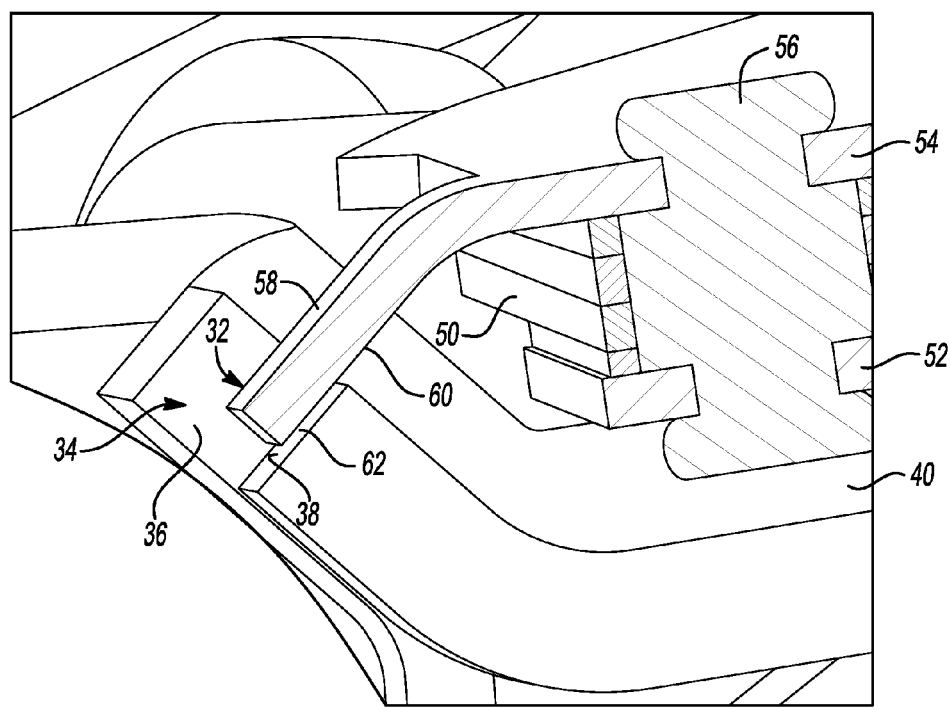
FIG. 3 is an enlarged cross-sectional view taken within the circle 3 in FIG. 2.

Referring to FIGS. 2 and 3, the construction and operation of the lug 32 and notch 34 are described in more detail. The pre-damper 14 includes an intermediate plate 50 that is disposed between a first pre-damper side plate 52 and a second pre-damper side plate 54. The intermediate plate 50 and the first and second pre-damper side plates 52 and 54 are retained on a pre-damper guide pin 56. The pre-damper guide pin 56 is also shown in FIG. 1.

The lug 32 is received in the notch 34 with the lug 32 engaging the radially extending sides 36 of the notch 34. The lug 32 may be spaced from the circumferentially extending surface 38. The lug 32 extends radially outwardly from the second pre-damper side plate 54. The lug 32 includes an outer axial side 58 and inner axial side 60.

The inner axial side 60 of the lug 32 is slightly spaced (approximately 0.25-0.5 mm) from the circumferentially extending surface 38 to define a gap 62. The gap 62 between the inner axial side 60 of the lug 32 and the circumferentially extending surface 38 of the notch 34 allows a limited degree of axial and radial movement between the lug 32 and the notch 34. The axial and radial movement permits a limited amount of angular movement between the clutch assembly 10 and the hub 16. The limited angular movement translates into reduced gap between the hub splines 18 to the facing surfaces and allows the damper assembly 10 to spin more freely.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A clutch assembly comprising:
  a hub;
  a damper attached to the hub, the damper including first and second side plates disposed on opposite axial sides of a pair of friction plates having friction linings, wherein the first and second side plates and the friction plates are operatively connected by a plurality of damper springs for damping between the first and second side plates and the pair of friction plates; and
  a pre-damper attached to the hub adjacent the damper and attached to the hub, the pre-damper comprising an intermediate plate, a first pre-damper side plate disposed on a first axial side of the intermediate plate, and a second pre-damper side plate disposed on an opposite axial side of the intermediate plate,
  wherein the first pre-damper side plate and the second pre-damper side plate are operatively connected by a plurality of pre-damper springs,
  wherein the first pre-damper side plate is adjacent the damper,
  wherein the second pre-damper side plate comprises a lug that extends radially outwardly and axially across the intermediate plate and across the first pre-damper side plate toward the first side plate that is adjacent the pre-damper,
  wherein the first side plate of the damper defines a notch, and
  wherein the lug is received in the notch defined by the first side plate of the damper and the notch prevents relative rotation between the first side plate of the damper and the pre-damper.

2. The clutch assembly of claim 1 wherein the notch comprises first and second radial edges, and wherein the lug includes first and second radially extending sides that engage the first and second radial edges of the notch.

3. The clutch assembly of claim 2 wherein the lug includes an outer axial side and an inner axial side, wherein the notch includes a surface extending circumferentially between the first and second radial edges of the notch, and wherein the inner axial side of the lug is spaced from the circumferentially extending surface of the notch to allow a limited degree of axial and radial movement between the lug and the notch.

4. The clutch assembly of claim 3 wherein the damper defines a plurality of spring pockets that are each adapted to receive a respective one of the plurality of damper springs, and wherein each of the plurality of spring pockets define one of a plurality of respective notches, the plurality of respective notches comprising the notch defined in the first side plate of the damper.

5. The clutch assembly of claim 4 wherein the plurality of respective notches are circumferentially centered relative to the plurality of spring pockets.

6. The clutch assembly of claim 2 wherein the damper defines a plurality of spring pockets that are each adapted to receive a respective one of the plurality of damper springs, and wherein each of the plurality of spring pockets define one of a plurality of respective notches, the plurality of respective notches comprising the notch defined in the first side plate of the damper.

7. The clutch assembly of claim 6 wherein the plurality of respective notches are circumferentially centered relative to the plurality of spring pockets.

8. A method of assembling a pre-damper and a damper to a hub, comprising:
  providing the hub;
  assembling the damper, the damper comprising a first side plate that defines a notch in a spring pocket;
  assembling the damper to the hub;
  assembling a pre-damper that comprises a first pre-damper side plate and a second pre-damper side plate, and the second pre-damper side plate comprises a radially and axially extending lug;
  assembling the pre-damper to the hub after the damper is assembled to the hub; and
  securing the lug into the notch so that the lug extends across the first pre-damper side plate to the first side plate.

9. The method of claim 8 wherein the step of assembling the damper further comprises:
  selecting a plurality of spring pocket openings defined in the first side plate;
  notching each of the spring pocket openings in the first side plate; and
  assembling the first side plate and a second side plate on opposite axial sides of a plurality of friction plates having friction linings, and assembling one of a plurality of damper springs into each of a plurality of spring pocket openings.

10. The method of claim 8 wherein the step of assembling the pre-damper further comprises:
  assembling the first pre-damper side plate and the second pre-damper side plate on opposite axial sides of an intermediate plate; and
  operatively connecting the first pre-damper side plate and the second pre-damper side plate to the intermediate plate with a plurality of pre-damper springs,
  wherein the step of securing the lug into the notch includes aligning the lug with the notch when the pre-damper is assembled to the hub.

11. The method of claim 8 wherein the step of assembling the damper further comprises:
  selecting a plurality of spring pocket openings defined in the first side plate;
  notching each of the spring pocket openings in the first side plate;
  assembling the first side plate and a second side plate on opposite axial sides of a plurality of friction plates having friction linings;
  assembling one of a plurality of damper springs into respective ones of the plurality of spring pocket openings;
  assembling the first and second pre-damper side plates on opposite axial sides of an intermediate plate; and
  operatively connecting the first and second pre-damper side plates to the intermediate plate with a plurality of pre-damper springs,
  wherein the lug extends axially across the intermediate plate and axially across the first pre-damper side plate toward the first side plate,
  wherein the first side plate is adjacent the pre-damper, and
  wherein the step of securing the lug into the notch includes aligning the lug with the notch when the pre-damper is assembled to the hub.

12. The method of claim 8 wherein:
  the step of assembling the damper is performed in a first assembly operation;
  the step of assembling the pre-damper is performed in a second assembly operation; and
  the steps of assembling the damper to the hub, assembling the pre-damper to the hub, and securing the lug into the notch are performed in a subsequent series of assembly operations after the first and second assembly operations.

13. A clutch assembly comprising:
  a hub;
  a damper attached to the hub, the damper comprising a first side plate disposed adjacent a friction plate comprising a friction lining, wherein the first side plate and the friction plate are operatively connected to damper springs for damping; and
  a pre-damper attached to the hub adjacent the damper, the pre-damper comprising pre-damper springs and a pre-damper side plate operatively connected to the pre-damper springs,
  wherein the first side plate of the damper defines a notch,
  wherein the pre-damper side plate comprises a lug that extends radially outwardly and that extends axially into the notch in the first side plate, and
  wherein the lug is received in the notch defined by the first side plate of the damper and the notch prevents relative rotation between the first side plate of the damper and the pre-damper.

14. A clutch assembly comprising:
  a hub;
  a damper attached to the hub, the damper comprising a first side plate and damper springs, wherein the first side plate is operatively connected to the damper springs for damping; and
  a pre-damper attached to the hub adjacent the damper, the pre-damper comprising pre-damper springs and a pre-damper side plate operatively connected to the pre-damper springs,
  wherein the first side plate of the damper defines a notch,
  wherein the pre-damper side plate comprises a lug that extends radially outwardly and that extends axially into the notch in the first side plate, and
  wherein the lug can move axially and radially with respect to the notch.

15. The clutch assembly of claim 14, further comprising a second side plate disposed on the damper.

16. The clutch assembly of claim 14, further comprising at least one friction plate comprising at least one friction lining operatively connected to the damper springs.

17. The clutch assembly of claim 14, wherein the damper defines a spring pocket adapted to receive one of the damper springs, and wherein the spring pocket defines the notch defined in the first side plate of the damper.

18. The clutch assembly of claim 14, wherein the notch comprises radially extending sides, and wherein the lug engages between the radially extending sides.

19. A clutch assembly mounted to a hub, the clutch assembly comprising:
  a damper attached to the hub, the damper comprising a first side plate and damper springs, wherein the first side plate is operatively connected to the damper springs for damping; and
  a pre-damper attached to the hub adjacent the damper, the pre-damper comprising pre-damper springs, a first pre-damper side plate disposed on a first axial side of the pre-damper springs, and a second pre-damper side plate disposed on an opposite axial side of the pre-damper springs,
  wherein the first side plate of the damper defines a notch, wherein the first pre-damper side plate and the second pre-damper side plate are operatively connected by the pre-damper springs, wherein the first pre-damper side plate is adjacent the damper, wherein the second pre-damper side plate comprises a lug that extends radially outwardly and that extends axially across the first pre-damper side plate and in to the notch in the first side plate that is adjacent the pre-damper, and wherein the lug and the notch are configured to permit angular movement between the hub and the clutch assembly.

20. The clutch assembly mounted to a hub of claim 19, wherein the notch comprises radially extending sides, and wherein the lug engages between the radially extending sides.

\* \* \* \* \*